July 2, 1946.   M. M. CULVER ET AL   2,402,950
MOLDED PART AND METHOD OF FORMING SAME
Filed April 13, 1943
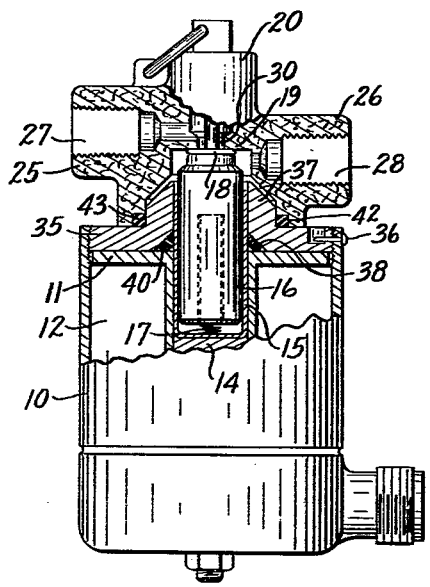
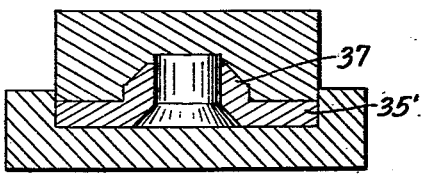
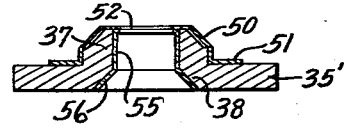
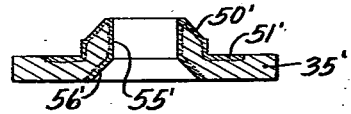
Inventor
Merlyn M. Culver
Lyle L. Duncan
By Marechal & Biebel
Attorneys Patented July 2, 1946

2,402,950

UNITED STATES PATENT OFFICE 2,402,950

MOLDED PART AND METHOD OF FORMING SAME

Merlyn M. Culver and Lyle L. Duncan, Dayton, Ohio

Application April 13, 1943, Serial No. 482,928

9 Claims. (Cl. 251—158)

This invention relates to liquid or gas-controlling mechanism or valves, and more particularly to parts thereof which are molded or formed and suitably treated to be impervious to liquids or gases.

The invention is illustrated in connection with a solenoid-controlled valve for controlling the flow of gasoline through fuel lines, as in an airplane, and is shown as embodied in certain parts which are so placed that they will be exposed to the flowing gasoline, or the like, and also to gasoline which might be trapped in various pockets or chambers. And one of the principal objects of the invention is to provide such parts which can be cheaply and economically made, which may be inherently permeable or porous to the gasoline or other liquids and yet which may be readily treated to provide sections which are impervious or leakproof with respect to the liquid or gas, such treated portions being readily located in those portions with which the liquid or gas may come in contact.

Another object of the invention is to provide such a part, for use in a gasoline-controlling valve or the like, which is formed of powdered iron, as by molding and sintering and which is therefore porous but which can be economically produced in this manner in smaller and irregularly shaped parts, and also to incorporate into the porous iron part a metal which will completely close up the pores of those portions which will be in contact with liquids or gases, and thus prevent leakage through the part as a whole, and make it function as satisfactorily as a carefully prepared machined or forged metal part and at considerable saving in expense of manufacture.

Another object is to provide a method of forming such parts with non-porous or impermeable portions.

Other objects and advantages of the invention will be apparent from the specification and claims and the drawing which forms part thereof.

In the drawing, in which a preferred embodiment of the invention is illustrated, and in which like characters of reference designate like parts throughout—

Fig. 1 is an elevational view, partly in section, of a solenoid-operated fuel-controlling valve having a non-porous and non-permeable part according to this invention;

Fig. 2 is a sectional view showing a diagrammatic form of mold or die for forming such powdered metal part, which part is suitably indicated in the cavity of the mold;

Fig. 3 is a sectional view of the part formed in Fig. 2, after sintering, showing portions of metal properly placed and to be treated so that under heat they will flow and penetrate the desired portions of the part to render those portions impermeable; and Fig. 4 is a corresponding sectional view of the same part after treatment renders certain portions non-porous and leakproof.

The form of liquid-control valve shown in Fig. 1 is used for illustrative purposes as incorporating a part embodying this invention and made according to the method thereof. This liquid control valve is of the solenoid-operated type and comprises a body portion 10, generally of metal, which has mounted therein a plastic spool 11, which receives a solenoid winding within the space marked 12. The axial passage through the spool 11 contains a core 14 and a cup member 15 above it within which is mounted a cylindrical valve having a body portion 16, which is urged upwardly by a spring 17 so that the face portion 18 at its upper end will seat against a corresponding seat portion 19 of the fitting 20.

The fitting 20 has diametrically opposed projections 25 and 26, each having a passage therein and threaded to receive a fuel line, the passage 27 being adapted to receive a line connected to a source of supply of gasoline, and passage 28 a line to deliver gasoline to a desired place. The particular type of valve disclosed is intended for feeding gasoline for short periods, e. g., when an airplane motor is stopped, to feed a small amount of gasoline into the lubricating oil within the engine so as to dilute that small portion of the oil and permit easier starting in the cold. The actual pipe lines are not shown as they are believed unnecessary to be illustrated.

The portion 19 has an opening 30 therein, which is controlled by the valve face 18, the spring 17 normally urging the valve body 16 and its portion 18 to close connection between the fuel lines 27 and 28; but upon energization of the solenoid in the space 12 the valve body 16 and its face portion are moved downwardly against the action of the spring 17 and fuel is allowed to flow from the supply source on through the passages 27 and 30 and on into the passage 28 and thence to the engine.

The body portion 10 is provided at its upper end with a member 35 which, as shown, is threaded into the body portion and held in place by a suitable lock screw 36. This part 35 serves to hold the solenoid spool 11 in place; also it has an upwardly projecting axial boss 37 in which the cylindrical valve cup 15 is located and in the upper end of which the cylindrical valve 16 reciprocates. Also the head fitting 20 may be suitably connected to this part 35 by means of screws or bolts, not shown.

Heretofore the part 35 has been machined from non porous and leakproof metal, so that any liquid fuel or gasoline coming in contact with it would not pass through. And to prevent this liquid fuel from leaking down around the outside of the cup 15, or leaking out to the atmosphere between the head fitting 20 and the part 35, suitable fuel sealing means, such as gaskets, have been provided. As illustrated, the bottom of the axial passage in the part 35 is chamfered off to provide an inclined surface 38, and a gasket 40 is inserted in the space thus provided so that as the part 35 is threaded down and locked in its proper assembled position this gasket will be caused to fit tightly around the outside of the cup 15 and against the top of the spool 11 and against the chamfered face of the part 35 to prevent any fuel leaking down around the outside of the cup and getting into the solenoid coil, or leaking out to perhaps work out through the screw threads at the outer edge of the part 35. Likewise the upper end of the boss or extension 37 is beveled and the corresponding portion of the end fitting 20 is similarly beveled, and the fitting is provided with a circular pocket 42 which receives a circular gasket 43 so that when the fitting is pulled down tightly in the assembled position the leakage of fuel or gas out between the fitting 20 and the part 35 also will be prevented.

When the part 35 is machined out of dense and non-porous leakproof metal, this construction satisfactorily prevents such leakage. However, the making of this part is a comparatively expensive operation, having in mind that when made in large quantities even small cost differences become quite important. Under this invention, the part 35 is made of powdered metal, preferably iron, which can be suitably molded under pressure and sintered under heat to bind the metal particles together to give adequate strength and adequately smooth surfaces, such parts being made for use as gears and the like, and the method of making such powdered iron parts being understood. However, one of the great advantages which has led to the commercial utilization of these parts has been the inherent porosity of the resulting formed part, which has been particularly advantageous where the parts are used for gears or bearings meant to run in oil because the part will absorb oil so that even though lubrication might fail, a substantial reserve of lubricant would be absorbed into the pores or voids of the formed part. Also, it has been known that with some very resistant metals, where it is desired to secure the equivalent of ductility, this could be attained by sintering the powdered metal into a rigid friable mass, causing this mass to absorb a ductile metal which would act to form, more or less, a ductile alloy which could then be drawn or rolled, after which the ductile metal could be melted and evaporated off to leave behind the properly formed resistant metal. In addition it has also been proposed to use powdered metal bearings, with the particles sintered together, and with the body portions of the bearings porous as stated, and to dip these porous bearings into a molten bath of low melting point metal, such as lead, for a sufficient time to permit the molten lead to penetrate into the pores sufficiently to provide an outside layer of lead held in place on the powdered metal member by its partial penetration and thus to form an adherent layer of lead on the outside, with the softer metal intended to form the bearing surface.

However, so far as we are advised, no one before has suggested forming articles of quite irregular shapes and dimensions out of powdered metal such as iron, thus saving very substantial amounts in machining costs and in loss of materials, and then to render such articles impervious and leakproof in selected portions so as to make these parts available for use under such operating conditions as described above, with resultant great advantage in productive output and manufacturing economies. In the practicing of this invention the powdered iron is molded in suitably shaped dies, as illustrated somewhat diagrammatically in Fig. 2, and the resulting molded part is then sintered to give it adequate strength for the work which it is to be called on to do. This part, which is marked 35', then has applied to it, at its upper side, an inverted cup-shaped member of copper 50, which has an outwardly extending flange portion 51, the shape of the cup-shaped copper member and flange being such as to conform to the surfaces with which liquid fuel might be expected to come in contact during operation, and the portion 51 extending outwardly a distance sufficient to extend completely beyond the gasket 43.

The cup-shaped member 50 has the center portion 52 left therein, over the passage through the extension 37, as during the forming of this completed part molten copper will tend to run down inside the passage and be absorbed into the body of the member 35' surrounding this passage. Likewise the cup-shaped member 55 is formed to fit snugly within the passage in the member 35' and this also has an outwardly flared portion 56 which fits against the chamfered face 38 which is later to contact with the gasket 40. The parts as thus assembled are placed upon a suitable conveyor or carrier and then placed in or passed through a furnace or oven and the temperature brought up sufficiently high to cause melting of the copper. When this is done the copper does not flow away from the porous member 35' but, unexpectedly on the contrary, perhaps through capillary action, seems to be almost instantaneously absorbed into the body of the member 35' and to fill the voids or spaces in the portion against which the copper is placed. As illustrated somewhat diagrammatically in Fig. 4, this leaves the member 35' with certain portions containing the copper which solidifies immediately upon cooling and generally fills up the portions which are indicated by the numerals 50', 51', 55' and 56'. As illustrated the appearance of these portions is greatly exaggerated, as in practice the copper seems to disappear into the part 35' and is almost undetectable by the naked eye and there is probably no such clear line of demarcation as is shown for illustrative purposes in the drawing. Nevertheless a small amount of copper will thus flow and disperse into the part 35' and will render the treated portions essentially leakproof and non-permeable. And it has been found that with the part 35' molded to have a thickness of approximately ¼", only a thin sheet of copper is required in order to impart adequate impermeability and leakproof qualities to the selected portions of the generally porous powdered iron part. For example, very satisfactory results have been secured in actual operation where the part 35' has substantially the dimensions mentioned and the copper sheet which is used to form the two cup members is 26 gauge, approximately .0159".

The use of such small quantities of copper with respect to th comparatively large mass of the part 35' astoundingly gives such modification of the part in the portions with which the copper is in contact that they are rendered leakproof with respect to any liquid fuel or gas which might come in contact with them in the structure as illustrated in Fig. 1, and therefore by so treating as to provide these very limited selected portions, so that they include all parts which are in contact with the fuel and extend out beyond the leakproof gaskets, the whole structure is made adequately leakproof, with a very great saving in cost of the part 35, as opposed to a machined metal part, and also with the utilization of only comparatively small quantities of copper. Satisfactory results have also been attained using other metals analogous to copper, such as bronze, but the metal must be one equivalent to these and which will have the capacity for passing almost instantaneously into the powdered metal part and solidifying the desired portions into nonpermeable solid metal which also is in nonpermeable contact with the powdered iron, thus to make that portion impermeable and leakproof.

For certain purposes, as for instance in solenoid-operated valves, it has been found, heretofore, that machined metal parts might require some form of heat treatment, e. g. annealing, in order to give desired magnetic qualities and thus give the necessary permeability to magnetic lines of force as required for operating the movable valve parts. It has been found that the heat treatment of the metal parts of this invention which is incident to the heating up of the formed part and the copper in order to melt the copper and cause it to be absorbed, also has a corresponding effect upon the magnetic characteristics of the parts made according to this invention. Furthermore, it has been likewise found that, although the properties of copper with respect to a magnetic field are, as is well known, quite different from those of iron or of the sintered molded iron part, nevertheless the absorption of the copper, while heated in a molten condition, with subsequent solidification to give the non-permeable portions not only does not adversely affect the magnetic properties of the resulting permeable composite but in fact appears to somewhat increase the magnetic characteristics over those of the sintered iron before the copper is included.

While the process and products herein described constitute preferred embodiments of the invention, it is to be understood that the invention is not limited to such precise process and products, and that changes may be made therein without departing from the scope of the invention which is defined in the appended claims.

What is claimed is:

1. In a fluid containing or transmitting structure, such as the valve mechanism described and having a fitting with fluid passages therethrough and a valve seat interposed between said passages and having an opening from one of said passages for receiving a member containing a movable valve body, said member having portions thereof positioned to be in contact with or in the path of the fluid, said member being made of powdered material resistant to the liquid and molded into an agglomerated liquid permeable mass and with said portions of said molded mass treated with a limited amount of material which is normally solid and adequately adherent to the powdered material and which is introduced by absorption into the pores of said portions of the molded member to make those portions of said member and retained within said portions which will be in contact with the liquid impermeable to passage of fluid therethrough, and sealing means between the surfaces of said impermeable portions and associated surfaces of cooperating parts to prevent any flow or leakage of fluid from the fluid passages.

2. In a fluid containing or transmitting structure, such as the valve mechanism described and having a fitting with fluid passages therethrough and a valve seat interposed between said passages and having an opening from one of said passages for receiving a member containing a movable valve body, said member having portions thereof positioned to be in contact with or in the path of the fluid, said member being formed of powdered metal molded into a liquid permeable form and sintered to give rigidity of form and substantial mechanical strength and having portions which are in contact with fluid rendered impermeable throughout the zone of fluid contact by a limited amount of metal which is absorbed into the pores of said portions of the body of said member while molten and which solidifies in nonpermeable contact within the molded part of said member which will be in contact with the liquid and sealing means between the surfaces of said inpermeable portions and associated surfaces of cooperating parts to prevent any flow or leakage of fluid from the fluid passages.

3. In a fluid containing or transmitting structure, such as the valve mechanism described, a member for closing an opening in said structure and having portions thereof positioned to be in contact with or in the path of the fluid, said member being formed of a liquid permeable body portion molded from powdered iron and sintered to give desired shape and rigidity and strength and which is permeable to liquid and which is rendered impermeable in portions with which the liquid would contact by a limited amount of metal absorbed into said portions while liquid and solidified and retained therein in nonpermeable contact within the powdered metal and sealing means between the surfaces of said impermeable portions and associated surfaces of cooperating parts to prevent any flow or leakage of fluid from the fluid passages.

4. For use in a fluid containing or transmitting structure, a part of irregular shape for closing an opening in the fluid containing structure with certain surface portions thereof subjected to contact with the liquid with respect to which the part is permeable, means such as packing for restricting travel of the liquid along surfaces of said part, and with the portions of said part extending from the restrictive packing zones throughout the area against which liquid may contact rendered nonpermeable to said liquid by the absorption of a limited amount of molten metal into the pores of such portions to solidify and be retained within such portions to form a nonpermeable zone in those portions functionally inside the packing zones and against which the liquid can contact.

5. The method of manufacturing a machinable part for use in a fluid containing or transmitting structure, which consists in molding powdered metal into the desired shape and dimensions and sintering said metal to form a permeable or porous metallic part of adequate strength and rigidity for closing the fluid containing space but permeable to the liquid, and causing said metal part to absorb a limited amount of molten metal into the pores of those portions which will be in contact with the liquid and solidifying the absorbed metal to be retained in said portions to close up the pores of the powdered metal part in such fluid contacting areas and to be in nonpermeable contact with said powdered metal.

6. The method of manufacturing a machinable part for use in a fluid containing or transmitting structure, which consists in molding powdered metal into the desired shape and dimensions and sintering said metal to form a permeable or porous metallic part of adequate strength and rigidity for closing the fluid containing space but permeable to the liquid, placing upon the formed powdered metal part a thin sheet of metal having a fusing temperature substantially below the fusing temperature of the molded sintered part and of extent sufficient to overlie all surface portions with which the liquid may come in contact, and heating said sheet of metal to its fusing temperature thus to absorb a limited amount of said metal into the molded metal part and retain the solidified metal within said part to render the part impermeable to leakage or passage of the liquid therethrough by rendering the selected portions thus impermeable to the liquid.

7. As an article of manufacture, a part for use in a fluid containing or transmitting structure providing a fluid containing space which comprises a molded powdered iron part of the desired shape and dimensions having the powdered iron sintered to form a permeable or porous metallic part of adequate strength and rigidity for closing an opening entering the fluid containing space but permeable to the liquid, and having those portions which will be in contact with the liquid during use rendered impermeable by placing thereagainst a layer of copper of limited amount and having a fusing temperature substantially below the fusing temperature of the molded sintered part and of extent sufficient to overlie all surface portions with which the liquid may come in contact and absorbing said copper while molten into said nonpermeable portions to provide nonpermeable surface portions of solidified copper retained in nonpermeable adherence within the powdered iron and of sufficient extent to impart impermeability to portions including all surfaces in contact with the liquid and sealing means between the surfaces of said impermeable portions and associated surfaces of cooperating parts to prevent any flow or leakage of fluid from the fluid containing space.

8. In a fluid containing or transmitting apparatus, such as the valve mechanism described and having a fitting with fluid passages therethrough, a valve seat within said fitting interposed in said passages, and a valve member extending into said fitting through an opening therein and carrying a valve face to seat against said seat with part of said valve member at all times exposed to fluid in the fitting, a member for closing said opening in the fitting and having portions thereof positioned to be in contact with or in the path of the fluid within said fitting, said member being formed of a liquid permeable body, and having said portions thereof in contact with the fluid treated with a limited amount of molten metal absorbed into and retained within portions of the permeable body having contact with the fluid to render impermeable those portions with which the fluid will contact.

9. In a fluid containing or transmitting structure, such as the valve mechanism described, and comprising a fitting with fluid passages therethrough, a valve seat within said fitting interposed in said passages, a member for closing the fluid containing space in said structure and having an opening therein for receiving a valve body, a valve body slideable in said opening and having a face for closing against said valve seat to interrupt the flow of fluid and valve operating mechanism therefor, and a container for the valve operating mechanism including mechanism which would be injured by said fluid, said container being appended outwardly from said member and having a fluid sealed space within the container aligned with the valve seat and the opening in the member for receiving the valve body, said member being so connected to the fluid containing structure that portions of the surface thereof will be in contact with fluid contained in or passing through said structure, said member comprising a molded powdered metal part of the desired shape and dimensions having the powdered metal sintered to form a permeable or porous metallic part of adequate strength and rigidity to close said fluid space and to support said container and operating mechanism, but permeable to the fluid, and having those portions the surfaces of which will be in contact with the fluid rendered impermeable by a limited amount of metal which is absorbed into the pores of such permeable portions while in molten form and which will be retained within said portions in non-permeable solid contact with the porous metallic structure of the member in such zones, to make non-permeable those surface portions against which the liquid may contact, and packing located within said non-permeable zone between the member and the structure to prevent contact of fluid with any permeable portions of the member.

MERLYN M. CULVER.
LYLE L. DUNCAN.